Figure 1:
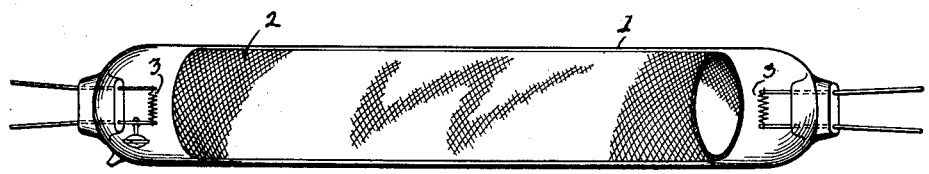

Aug. 22, 1939.  S. RUBEN  2,170,066

FLUORESCENT LAMP

Filed May 27, 1938

INVENTOR
*SAMUEL RUBEN*
BY
ATTORNEY

Patented Aug. 22, 1939

2,170,066

UNITED STATES PATENT OFFICE 2,170,066

FLUORESCENT LAMP

Samuel Ruben, New Rochelle, N. Y.

Application May 27, 1938, Serial No. 210,308

6 Claims. (Cl. 176—122)

This invention relates to a fluorescent lamp and, particularly, to a lamp of the ionic discharge type in which ultra violet rays are generated and which, in turn, cause the fluorescence of an active material.

The main object of this invention is to increase the light efficiency of this type of lamp which in the present art uses a coating of a fluorescent material upon the inner walls of a glass tube activated by ultra violet radiation or on the outer wall of a glass tube permeable to ultra violet radiation. Broadly, the efficiency is improved by increasing the area of the fluorescent material exposed to the ultra violet rays within the glass tube.

Other objects will be apparent from the disclosure.

The illumination efficiency of a fluorescent lamp of this type is dependent in part upon the area of the fluorescent material covering the wall surface. I have found that the light efficiency is improved by using within the glass tube or other translucent container, instead of the wall coating of a fluorescent material, a fibrous inorganic silicate material preferably in cylindrical form coated with a fluorescent material, the light emitting area being then greatly in excess of that of the wall coating of the lamps of the present art. The cylindrical structure is composed of glass wool fibers widely spaced apart, capable of withstanding the high temperature necessary in the evacuation of the container tube and in operation not affecting the purity of the gas within the tube.

The body composed of fibrous material is preferably in cylindrical form, the glass wool fibers being woven into a wide mesh cloth or rolled together to create the desired form. The glass wool fibers are coated preferably by spraying with a fluorescent alkaline earth silicate, as cadmium, berylium or zinc silicates, according to the color of the light desired, with a suitable binder, as a weak sodium silicate solution or as commonly used in the art. The materials used must be capable of withstanding the high temperature of tube evacuation and incapable of affecting the low pressure gas contained within the tube when in operation. When the cylinder is so prepared it is introduced into the tube chamber.

While glass wool is preferred as a means for supporting the fluorescent material, other silicate fibers, such as asbestos can be employed. The previously evacuated tube also contains an electrode at either end, all within a monatomic gas, such as neon, argon, helium, crypton or zenon, together with mercury which is discharged from a pellet after the tube has been evacuated.

The ultra violet discharge between the electrodes causes the fluorescent coating to become luminescent, and the radiation area of the coated fibers being greater than that of the fluorescent coating of the tubes of the present art, the light efficiency is correspondingly increased.

Reference is made to the accompanying drawing in which Fig. 1 illustrates an evacuated glass tube 1, containing a monatomic gas, together with mercury at low pressure and a cylindrical tube 2, composed of glass wool fibers woven into a wide mesh cloth spray coated with a fluorescent alkaline earth silicate with a binder, and electrodes 3, at either end of the tube.

Figure 2:
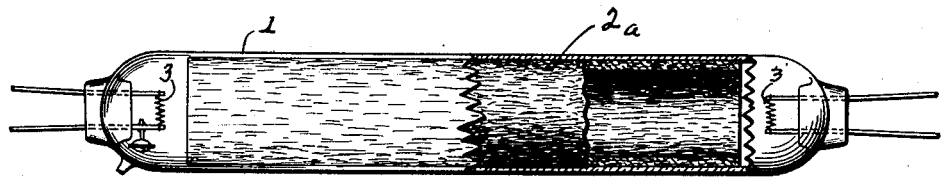

Fig. 2 is a similar tube, equipped with glass wool fibers rolled together and forming a cylinder 2a, spray-coated with a like fluorescent coating.

Having described my invention, what I claim as new and desire to secure by Letters Patent, is:

1. An ionic discharge lamp comprising a low pressure gas-filled glass vessel containing electrodes and a mat composed of glass wool fibers having a coating of a fluorescent material.

2. An ionic discharge lamp comprising a glass vessel filled with neon and mercury at low pressure, electrodes and a mat composed of glass wool fibers having a coating of a fluorescent material.

3. An ionic discharge lamp comprising a glass vessel filled with neon and mercury at low pressure, electrodes and a mat composed of glass wool fibers having a coating of fluorescent cadmium compound.

4. An ionic discharge lamp comprising a glass vessel filled with a monatomic gas and mercury at low pressure, electrodes and a mat composed of glass wool fibers having a coating of a fluorescent material.

5. An ionic discharge lamp comprising a low pressure gas-filled glass vessel containing electrodes and a mat composed of glass wool fibers having a coating of a fluorescent material with a binder.

6. An ionic discharge lamp comprising a low pressure gas-filled glass vessel containing electrodes and a mat composed of siliceous fibers having a coating of a fluorescent material.

SAMUEL RUBEN.